US012053748B2

(12) United States Patent
Valencuk

(10) Patent No.: US 12,053,748 B2
(45) Date of Patent: Aug. 6, 2024

(54) HOMOGENIZER FOR LIQUID FOOD

(71) Applicant: Tetra Laval Holdings & Finance S.A., Pully (CH)

(72) Inventor: Jozo Valencuk, Torna Hällestad (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 795 days.

(21) Appl. No.: 16/973,647

(22) PCT Filed: Jun. 13, 2019

(86) PCT No.: PCT/EP2019/065569
§ 371 (c)(1),
(2) Date: Dec. 9, 2020

(87) PCT Pub. No.: WO2019/238862
PCT Pub. Date: Dec. 19, 2019

(65) Prior Publication Data

US 2021/0245120 A1 Aug. 12, 2021

(30) Foreign Application Priority Data

Jun. 14, 2018 (EP) .................................... 18177851

(51) Int. Cl.
*B01F 25/00* (2022.01)
*B01F 25/441* (2022.01)
(Continued)

(52) U.S. Cl.
CPC ...... *B01F 25/4412* (2022.01); *B01F 25/4422* (2022.01); *B01F 35/22161* (2022.01); *B01F 35/7174* (2022.01); *B01F 35/717613* (2022.01)

(58) Field of Classification Search
CPC .............. B01F 25/4412; B01F 35/7174; B01F 35/22161
See application file for complete search history.

(56) References Cited

U.S. PATENT DOCUMENTS 3,504,686 A * 4/1970 Ford ........................ B01F 23/49 137/593
4,621,023 A 11/1986 Redziniak
(Continued)

FOREIGN PATENT DOCUMENTS

CN 1165297 A 11/1997
CN 101835530 A 9/2010
(Continued)

OTHER PUBLICATIONS

International Search Report for corresponding Application No. PCT/EP2019/065569, mailed Aug. 1, 2019.
(Continued)

*Primary Examiner* — Anshu Bhatia
(74) *Attorney, Agent, or Firm* — Renner, Otto, Boisselle & Sklar, LLP

(57) ABSTRACT

A homogenizer for liquid food includes a homogenization device having a gap formed between a seat and a forcer. A pump is configured to provide a pressure for forcing the liquid food through the gap and thereby homogenize the liquid food. The homogenizer includes an accumulator, wherein the pump is connected to the accumulator to accumulate a pressure in the accumulator. A cylinder arrangement is connected to the accumulator and to the homogenization device. The cylinder arrangement includes a piston that is configured to push a volume of the liquid food through the gap. A valve is arranged to release pressure accumulated in the accumulator, such that the released pressure actuates the piston to push the volume of the liquid food through the gap.

9 Claims, 1 Drawing Sheet

(51) Int. Cl.

| | |
|---|---|
| ***B01F 25/442*** | (2022.01) |
| ***B01F 35/221*** | (2022.01) |
| ***B01F 35/71*** | (2022.01) |

(56) References Cited

U.S. PATENT DOCUMENTS

| | | | | | |
|---|---|---|---|---|---|
| 4,927,567 | A * | 5/1990 | Rudick | B67D 1/103 261/DIG. 7 |
| 6,827,479 | B1 | 12/2004 | Xia et al. | |
| 2005/0197409 | A1 | 9/2005 | Grasselli | |
| 2010/0208545 | A1 * | 8/2010 | Ando | B01F 25/4412 366/138 |

FOREIGN PATENT DOCUMENTS

| | | | |
|---|---|---|---|
| CN | 102317628 | A | 1/2012 |
| CN | 104214143 | A | 12/2014 |
| CN | 107002656 | A | 8/2017 |
| CN | 206823677 | U | 1/2018 |
| EP | 0 107 559 | A1 | 5/1984 |
| EP | 2 492 335 | A1 | 8/2012 |
| WO | 2010/018805 | A1 | 2/2010 |

OTHER PUBLICATIONS

Extended European Search Report for corresponding Application No. 18177851.5, mailed Jan. 4, 2019.

* cited by examiner

HOMOGENIZER FOR LIQUID FOOD

TECHNICAL FIELD

Embodiments herein relate to a homogenizer comprising a homogenization device having a gap formed between a seat and a forcer, and a pump configured to provide a pressure for forcing the liquid food through the gap and thereby homogenize the liquid food.

BACKGROUND

Industrial scale handling of liquid food such as dairy products often involves homogenization. Homogenization is performed for dairy products in order to stabilize a fat emulsion of the product against gravity separation and thereby stopping fat globules from clumping. The homogenization is obtained essentially by mechanical means in that the liquid food is forced through a small gap at high velocity.

Requirements regarding the detailed characteristics of homogenized dairy products and other liquid food may vary to a large extent. It is therefore necessary, in an industrial context, to be able to make tests and make adjustments to various parameters in a homogenization process. An important parameter of a homogenization process includes the pressure at which the liquid food is forced through a small gap, the size of which is also important.

To arrive at a specific desired combination of characteristics of a homogenized liquid food, it is typically necessary to perform a large number of tests. However, typical industrial scale homogenizers are very large and designed to handle very large flows and volumes of liquid food. Testing by using such industrial scale homogenizers are therefore not feasible, not least in terms of cost.

Laboratory scale homogenizers, in contrast to industrial scale homogenizers, are therefore typically used when making such homogenizer tests. However, there are drawbacks related to the use of prior art laboratory scale homogenizers. For example, it is difficult to replicate realistic combinations of essential characteristics of an industrial scale homogenizer. For example, it is difficult, in prior art laboratory scale homogenizers, to replicate a realistic combination of pressure of the liquid food and the gap size of the gap through which the liquid food is forced.

SUMMARY

In view of the above, an object of the present disclosure is to overcome or at least mitigate at least some of the drawbacks related to prior art laboratory scale homogenizers.

This object is achieved in a first aspect by a homogenizer for liquid food that comprises a homogenization device having a gap formed between a seat and a forcer. A pump is configured to provide a pressure for forcing the liquid food through the gap and thereby homogenize the liquid food. The homogenizer is characterized by an accumulator, wherein the pump is connected to the accumulator to accumulate a pressure in the accumulator. A cylinder arrangement is connected to the accumulator and to the homogenization device. The cylinder arrangement comprises a piston that is configured to push a volume of the liquid food through the gap. A valve is arranged to release pressure accumulated in the accumulator, such that the released pressure actuates the piston to push the volume of the liquid food through the gap.

Such a homogenizer may be of any size, including a size that is suitable in a laboratory scale context. It is capable of replicating a combination of pressure of the liquid food and the gap size of the gap through which the liquid food is forced that is the same or at least similar to the corresponding characteristics in an industrial scale homogenizer.

In a second aspect there is provided a method of homogenizing liquid food that comprises accumulating pressure in an accumulator. Pressure is released from the accumulator into a cylinder arrangement such that a piston in the cylinder arrangement performs a stroke that forces liquid food through a gap in a homogenizing unit.

This further aspect provides effects and advantages corresponding to the effects and advantages as summarized above in connection with the first aspect. All features and variants described herein in connection with the homogenizer according to the first aspect may be used for the method according to the second aspect, and vice versa.

BRIEF DESCRIPTION OF THE DRAWINGS

Embodiments of the invention will now be described, by way of example, with reference to the accompanying schematic drawings, in which.

DETAILED DESCRIPTION

Figure 1:
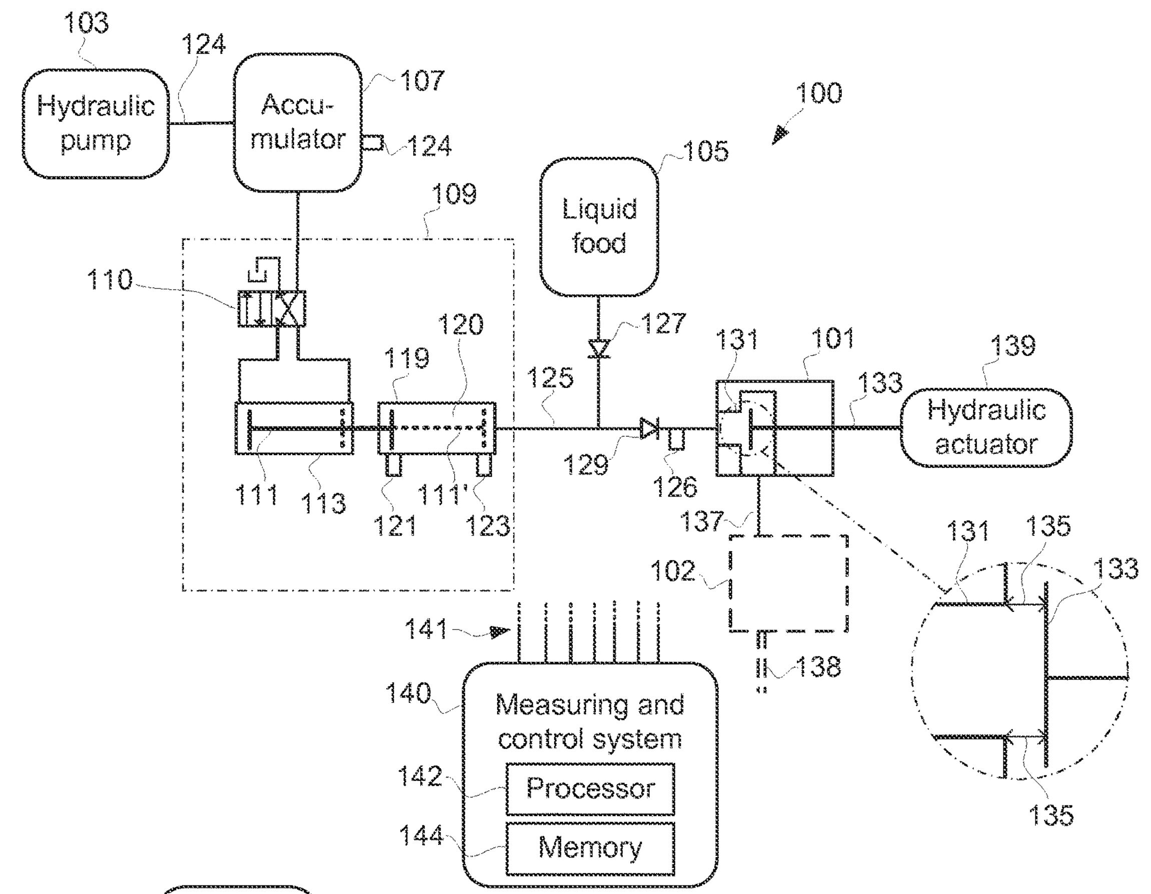
FIG. 1 is a schematic illustration of a homogenizer.

With reference to FIG. 1, an embodiment of a homogenizer 100 for liquid food comprises a homogenization device 101 that has a gap 135 formed between a seat 131 and a forcer 133. The gap 135 between the seat 131 and the forcer 133 may, in various embodiments have a width that is in the interval 10-60 μm. A hydraulic actuator 139 may be used for maintaining a desired gap 135 by for the purpose a conventionally arranged hydraulic circuitry (not shown in FIG. 1) associated with the forcer 133.

A pump 103 is configured to provide a pressure for forcing the liquid food through the gap 135 and thereby homogenize the liquid food. The homogenized liquid food may exit the homogenizing device 101 through a liquid food line 137 to further processing equipment (not illustrated in FIG. 1) or continue into a second homogenizing device 102 that may be attached to the homogenizing device 101. Such a second homogenizing device 102 may consequently provide further homogenized liquid food through a further liquid food line 138.

The pump 103 is connected to an accumulator 107 to accumulate a pressure in the accumulator 107. For example, the accumulator 107 may be configured to hold hydraulic fluid at a pressure of at least 40 bar, preferably in the interval 40-150 bar.

A cylinder arrangement 109 is connected to the accumulator 107 and to the homogenization device 101. The cylinder arrangement 109 comprises a piston 111 that is configured to push a volume of the liquid food through the gap 135.

Hydraulic fluid lines, exemplified in FIG. 1 by hydraulic fluid line 124, establish a hydraulic circuit that connects the pump 103, the accumulator 107 and a hydraulic fluid chamber 113 in the cylinder arrangement 109.

A liquid food vessel 105 is connected to the cylinder arrangement 109 to provide the liquid food into the cylinder arrangement 109 via a non-return valve 127.

Liquid food lines, exemplified in FIG. 1 by liquid food line 125 establish a liquid food circuit that connects the cylinder arrangement 109, the liquid food vessel 105 and the homogenization device 101. A further non-return valve 129 arranged along the liquid food line 125 may operate in conjunction with the non-return valve 127 in order to enable repeated forcing of liquid food via the liquid food line 125 from the liquid food vessel 105, via the cylinder arrangement 109 to the homogenization device 101.

As exemplified in FIG. 1, the cylinder arrangement 109 may comprise a liquid food chamber 119 connected to the homogenization device 101 for pushing the volume of the liquid food through the gap 135 between the seat 131 and the forcer 133. Such a liquid food chamber 119 may comprise a volume 120 configured to hold 30-200 ml of liquid food. That is, such a liquid food chamber 119 is a laboratory scale device that enables use of the homogenizer 100 in a laboratory/testing context and thereby avoiding expensive and wasteful use of industrial scale equipment.

A valve 110, for example in form of a conventional directional control valve, is arranged to release pressure accumulated in the accumulator 107, such that the released pressure actuates the piston 111 to push the volume of the liquid food through the gap 135.

In various embodiments, the homogenizer 100 is configured such that the liquid food may be forced through the gap 135 at a rate of 140-250 liters per hour. For example, the cylinder arrangement 109 may be arranged such that the piston 111 moves at a speed that corresponds to such a flow rate.

In various embodiments, the accumulation of pressure in the accumulator 107 may be limited such that subsequent actuations of the piston 111 are separated in time by at least 2 seconds. In other words, such an arrangement enables control of the flow rate of the liquid food and associated measurement of any desired characteristics of homogenized liquid food exiting from the homogenizing device 101.

As exemplified in FIG. 1, a pressure sensor 124 may be arranged at the accumulator 107 in order to enable sensing, by the measuring and control system 140, what pressure is accumulated by the pump 103 into the accumulator 1078. Also, a sensor arrangement 121, 123 may be connected to the cylinder arrangement 109. Such a sensor arrangement 121, 123 may be configured to provide timing information to a measuring and control system 140, the timing information representing the duration of a stroke of the piston 111. A flow sensor arrangement 126 may be arranged in the liquid food line 125 to sense a flow rate of the liquid food.

The measuring and control system 140 comprises electronic circuitry, including processing and memory means in the form of a processor 142 and a memory 144, which is connected via electric connections 141 to the various functional units of the homogenizer 100. That is, the connections 141 may be configured to detect sensor input and provide control signals to the valve 110, the sensor arrangements 121, 123, 124, 126, the pump 103, the accumulator 107, the cylinder arrangement 109, the liquid food vessel 105, the homogenizing device 101 and the actuator 139 and second homogenizing device 102 if present.

Figure 2:
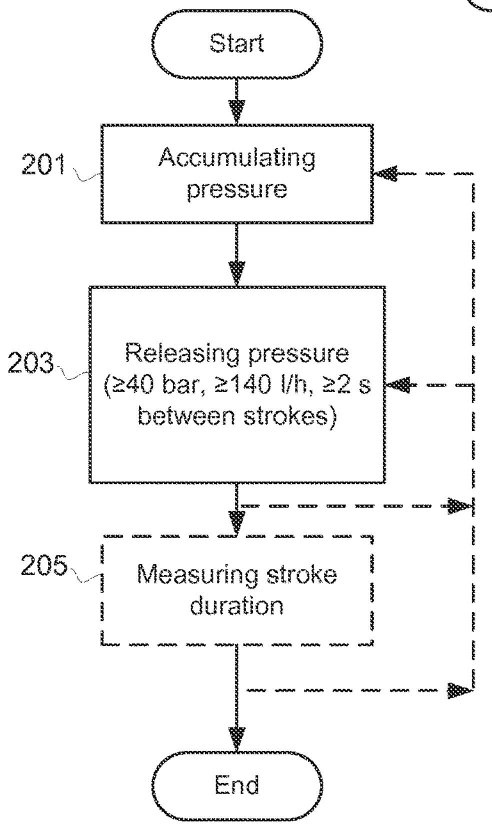
FIG. 2 is a flowchart of a method of homogenizing.

Turning now to FIG. 2 and with continued reference to FIG. 1, software instructions that are stored in the memory 144 may be executed by the processor 142 in the measuring and control system 140 in order to obtain measurable values and to provide control signals to the homogenizer 100, via the electric connections 141, and thereby perform a method of homogenizing liquid food.

Such a method comprises accumulating 201 pressure in the accumulator 107 and releasing 203 pressure from the accumulator 107 into the cylinder arrangement 109 such that the piston 111 in the cylinder arrangement 109 performs a stroke that forces liquid food through the gap 135 in the homogenizing unit 101, for example at a rate of at least 140 liters per hour, and in some embodiments preferably in the interval 140-250 liters per hour.

The step of step of accumulating 201 pressure in the accumulator 107 may comprise accumulating a pressure of at least 40 bar, preferably in the interval 40-150 bar.

In some embodiments, the method comprises measuring 205 duration of a stroke by the piston 111. Such a measuring step may be realized by means of sensors 121, 123 arranged at the liquid food chamber 119 and configured to detect movement of the piston 111 when the piston forces liquid food out of the liquid food chamber 119 and thereby emptying the volume 120. Such a measurement of stroke duration may be used in conjunction with controlling the piston 111 to move at a speed that corresponds to such a flow rate. The flow rate may be determined by a simple mathematical operation comprising a division of the volume 120 by the measured stroke duration for the piston 111.

In various embodiments, at least the step of releasing 203 pressure from the accumulator 107 into the cylinder arrangement 109 is repeated a plurality of times such that subsequent strokes of the piston 111 are separated in time by at least 2 seconds. As illustrated in FIG. 2, such a repetition may include repeating also the step of accumulating 201 pressure in the accumulator 107.

In more detail, when the homogenizer 100 is operated, first the pump 103 accumulates a pressure in the accumulator 107. When the desired pressure is accumulated, as sensed via the pressure sensor 124 to have reached the accumulator pressure level required for obtaining a desired pressure for liquid food passing the homogenization device 101, the valve 110 is opened to direct fluid from the accumulator 107 and into the hydraulic fluid chamber 113, on the left side of the piston 111 to thereby pushing the piston 111 such that it performs a stroke and reaches the position illustrated by the dotted lines 111', see FIG. 1. The piston 111 extends into the liquid food chamber 119 and causes liquid food therein to be pushed out from the liquid food chamber 119, past the non-return valve 129 and into the homogenizing device 101 where the liquid food continues through the gap 135 between the seat 131 and the forcer 133, whereby it becomes homogenized and exits through the liquid food line 137.

The piston 111, being in the position as illustrated by dotted lines 111', is moved back (retracted) to its starting position by switching the valve 110 to direct fluid from the accumulator 107 to the right side of the piston 111 in the hydraulic fluid chamber 113. Liquid food is then drawn via the non-return valve 127 from the liquid food vessel 105, filling the liquid food chamber 119 with liquid food, making the liquid food chamber 119 ready for a subsequent stroke of the piston 111 as described above. In principle, the hydraulic fluid chamber 113 is a conventional double acting cylinder that is controlled by the valve 110 in combination with a relief valve and hydraulic fluid reservoir (not shown). The accumulator 107 is then the component that provides the pressure that is used for operating the hydraulic fluid chamber 113.

When the required pressure level has again been reached in the accumulator 107, the procedure of making a stroke as described above may be repeated.

The invention claimed is:

1. A homogenizer for liquid food, comprising:

a homogenization device having a gap formed between a seat and a forcer, a pump configured to provide a pressure for forcing the liquid food through the gap and thereby homogenize the liquid food, an accumulator, wherein the pump is connected to the accumulator to accumulate a pressure in the accumulator, a cylinder arrangement, connected to the accumulator and to the homogenization device and comprising a piston that is configured to push a volume of the liquid food through the gap, and a valve arranged to release pressure accumulated in the accumulator, such that the released pressure actuates the piston to push the volume of the liquid food through the gap.

2. The homogenizer of claim 1, wherein the accumulator is configured to hold hydraulic fluid at a pressure of at least 40 bar.

3. The homogenizer of claim 2, wherein the accumulator is configured to hold hydraulic fluid at a pressure in the interval 40-150 bar.

4. The homogenizer of claim 1, wherein the gap has a width in the interval 10-60 μm.

5. The homogenizer of claim 1, configured such that the liquid food is forced through the gap at a rate of 140-250 liters per hour.

6. The homogenizer of claim 1, wherein the cylinder arrangement comprises a liquid food chamber connected to the homogenization device for pushing the volume of the liquid food through the gap, wherein the liquid food chamber comprises a chamber configured to hold 30-200 ml of liquid food.

7. The homogenizer of claim 1, wherein the accumulation of pressure in the accumulator is limited such that subsequent actuations of the piston are separated in time by at least 2 seconds.

8. The homogenizer of claim 1, comprising a sensor arrangement connected to the cylinder arrangement, the sensor arrangement being configured to provide timing information to a measuring and control system, said timing information representing the duration of a stroke of the piston.

9. The homogenizer of claim 1, comprising a liquid food vessel that is connected to the cylinder arrangement to provide the liquid food into the cylinder arrangement via a non-return valve.

* * * * *